Figure 1:
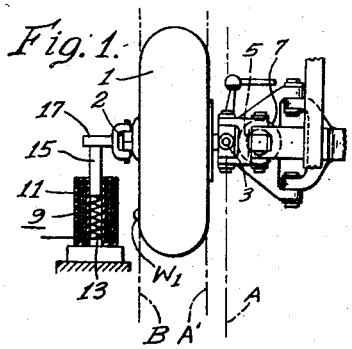

Nov. 21, 1944.  A. C. HAGG  2,363,316

VEHICLE WHEEL BALANCING

Filed July 31, 1942

WITNESSES:
C. J. Weller.
C. F. Overheim.

INVENTOR
Arthur C. Hagg.
BY
Paul E. Friedemann
ATTORNEY

Patented Nov. 21, 1944

2,363,316

UNITED STATES PATENT OFFICE 2,363,316

VEHICLE WHEEL BALANCING

Arthur C. Hagg, Forest Hills, Pa., assignor to Westinghouse Electric & Manufacturing Company, East Pittsburgh, Pa., a corporation of Pennsylvania Application July 31, 1942, Serial No. 453,075

13 Claims. (Cl. 73—66)

The present invention relates to methods for determining and correcting the unbalance in the wheels of a road or a land vehicle without requiring the removal of the wheels from the vehicle, such methods being also disclosed in my co-pending application Serial No. 391,046, filed April 30, 1941, which was abandoned in view of the disclosure and claims of this present patent.

More particularly, this invention relates to an improvement in the method of setting up vibration systems in vehicle wheel assemblies and utilizing these systems to determine and correct unbalance conditions existing in the vehicle wheels.

The necessity for refinement of vehicle wheel balance in order to prevent undesirable vibrations from this source is largely due to present day high speeds of automobile, trucks, etc. Unbalance conditions caused either by a condition of "static" or "dynamic" unbalance or a combination of both, may, at certain operating speeds, set up vibrations which make the vehicle dangerous to operate.

Investigations indicate that a wheel "statically" and "dynamically" balanced in balancing apparatus separate from the vehicle may shown a condition of serious unbalance under operating conditions while mounted on the vehicle. This may be due in part to some slight misalignment of the wheel bearing mount sufficient to cause an eccentricity of wheel mounting. As a result efforts are now being made to determine and correct unbalance conditions in vehicle wheels without removing them from the vehicle.

Of the present known methods for balancing vehicle wheels under simulated operating conditions, none provide vibration systems devoid of external vibrations. For example, one method of wheel balancing provides a support centrally located of the vehicle axle to elevate the associated wheels above the ground and provide a pivot about which the vehicle axle may oscillate angularly in a substantially vertical plane in response to an unbalanced condition in a rotating wheel. This rotating wheel is frictionally driven to a relatively high speed by some external drive means and then allowed to drift. When the speed falls to a value corresponding to resonant speed "static" unbalance determinations are made with suitable apparatus, positioned to pick up or determine angular oscillations of the axle in a vertical plane about the point of support. Such method, however, has been found to be inaccurate for determining wheel unbalance. For instance, because of one central support, vibrations of the axle will effect intermittent applications of force to the suspension springs, thereby initiating body or chassis vibrations which are reflected back to the axle through the suspension springs to introduce very complex errors and necessitate a large amount of experimenting with weight, sizes and positions. In addition, a dynamic couple about the central support will be introduced by any "dynamic" unbalance, which will materially affect the "static" unbalance determination.

After correcting the "static" unbalance as determined by this method, it is necessary to "dynamically" balance the wheel on front wheel assemblies in order to avoid oscillating angular movement of the wheel and spindle about the kingpin axis. As already mentioned, "dynamic" unbalance introduces errors in the "static" unbalance indications. Similarly any "static" unbalance remaining in the wheel (which is usually the case for the reasons already given) will materially affect the "dynamic" unbalance indications. The addition of the "dynamic" balancing weights in their proper positions is very often prevented by the previously placed "static" balancing weight which necessitates relocating of the weights. Certain positions of the wheel as indicated by the balancing apparatus used may also necessitate the addition of two pairs of "dynamic" balancing weights.

From the foregoing description, it may be seen that in addition to the difficulties encountered in obtaining an accurate unbalance determination, the correction of the unbalance involves the positioning of numerous weights, the combined effect of which increases the possibility of error and makes a completely balanced wheel difficult to achieve.

It is, therefore, a principal object of my invention to provide a method for setting up easily obtained vibration systems, in vehicle wheel assemblies, devoid of external vibrations and to so utilize these vibration systems that the determination and correction of unbalance conditions in vehicle wheels with respect to these vibration systems will be greatly simplified.

A further object of my invention is to provide an easily obtained horizontal single-degree-of-freedom vibration system (that is, one in which the locus of vibration is a portion of a circle contained within a single plane) in a vehicle wheel assembly that will, upon rotation of the vehicle wheel at some predetermined speed, vibrate in response to unbalanced conditions existing in the wheel and be devoid of external vibrations resulting from body or chassis movements.

A further object of my invention is to provide an easily obtained vertical single-degree-of-freedom vibration system in a vehicle wheel assembly that will, upon rotation of the vehicle wheel at some predetermined speed vibrate in response to unbalanced conditions existing in the wheel and be devoid of external vibrations resulting from body or chassis movements.

A specific object of my invention is to utilize vibration systems of the character referred to above, to first determine and correct an unbalance condition in the wheel with respect to a horizontal vibration system and second to determine and correct the remaining unbalance condition in the wheel with respect to a vertical vibration system to bring the wheel into a condition of complete "static" and "dynamic" balance.

A further specific object of the invention is to utilize vibration systems of the character referred to above to completely balance a vehicle wheel by adding but two balancing weights.

Figure 2:
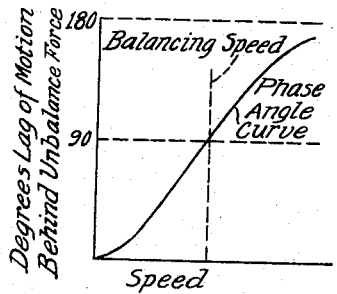
Figure 5:
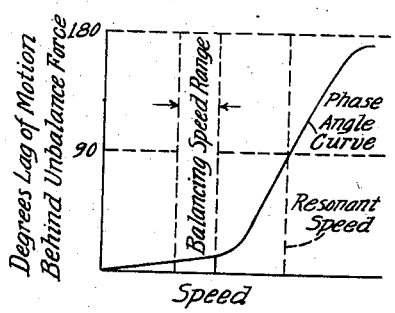
Figure 3:
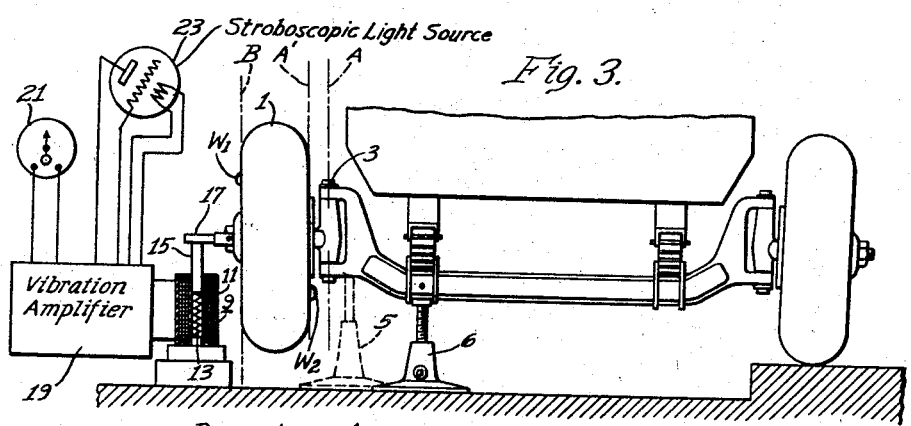
Figure 4:
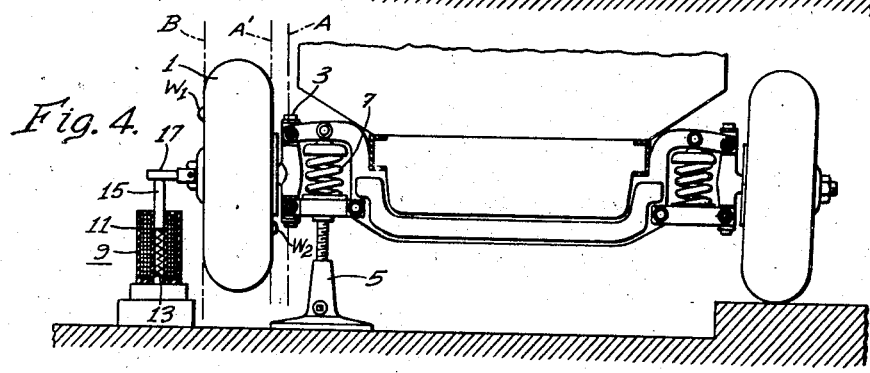
Figure 6:
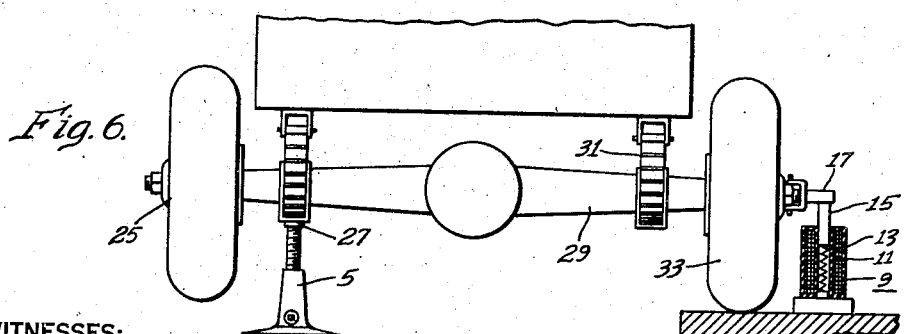
Figure 7:
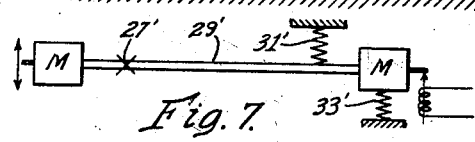

Other objects and advantages will become more apparent from a study of the following specification when considered in conjunction with the accompanying drawing, in which:

Figure 1 is a top view of a "knee action" type of automobile (or truck) front wheel suspension, Fig. 2 graphically illustrates the phase angle between the motion and the force of a vibrating system as would exist for example in Fig. 1, Fig. 3 is a schematic showing of a front view of the axle type steering wheels of an automobile (or truck) together with a schematic showing of the application of suitable balancing apparatus, Fig. 4 is a schematic showing of the front or steering wheels of an automobile (or truck) having "knee action" type of wheel suspension, Fig. 5 graphically illustrates the phase angle between the motion and the force of a vibrating system as would exist for example in Figs. 3, 4 and 6, Fig. 6 is a view of the rear wheel suspension of an automobile or truck, Fig. 7 schematically illustrates the vibration system which exists in Fig. 6.

It is a well known fact that any rotating body may be balanced by the addition (or subtraction) of weight in each of two arbitrarily chosen balancing planes transverse to the axis of rotation.

In general practice in order to determine the angular location of the weight to be added to the rotating body in each of a pair of chosen balancing planes the effect of the unbalance component in the one plane upon the unbalance determination in the other plane is eliminated. Unbalance determinations and corrections are then made separately in each of the chosen planes.

In the balancing procedure outlined above, it is necessary to first establish an angular single-degree-of-freedom vibration system before the balancing operation is begun. For example, consider a rotor mounted on a shaft journalled at each of its extremities in bearings having freedom of movement in a horizontal plane but restricted from movement in a vertical plane and assume a pair of balancing planes in which the rotor is to be balanced to be positioned approximately in the axial extremities of the rotor body. It is necessary, in order to eliminate the effect of the unbalance component in one plane upon the unbalance determination in the other plane, to restrict horizontal movement of one of the bearings in response to unbalance conditions in the rotor when it is rotated. By so limiting movement of one of the bearings in which the rotor is journalled, an oscillating angular movement of the rotor and shaft about the fixed bearing in a single plane, that is, the plane of freedom of the free bearing, is had and unbalance determinations in the balancing plane adjacent the free bearing will not be affected by the unbalance component in the balancing plane adjacent the fixed bearing.

It, therefore, follows that in the analysis for the determination of unbalance existing in a vehicle wheel while mounted on the vehicle suitable angular single-degree-of-freedom vibration systems must be established in the vehicle wheel assembly. In addition, in order to obtain accurate determinations of unbalance conditions existing in the wheel the vibration systems must respond alone to unbalances in the rotating wheel and be devoid of external vibrations.

Accordingly, it was found that by properly supporting a vehicle front axle to exclude any possibility of vibrations from body or chassis movements, a single-degree-of-freedom vibration system providing oscillating angular movement of the wheel and spindle in a horizontal plane about the kingpin axis is obtainable. A second vibration system providing single-degree-of-freedom bending vibration of the wheel and spindle in a vertical plane by means of properly located support beneath the vehicle axle is also obtainable. The proper application of these systems in the balancing procedure hereinbefore described provide a fundamentally correct analysis of the unbalance of a vehicle wheel with respect to its mount.

Referring now to the drawing, there is shown in Fig. 1 a top view of a "knee action" type of automobile (or truck) front wheel suspension. The wheel 1 is rotatably mounted on a spindle 2 having angular freedom about the kingpin axis 3 in a substantially horizontal plane. The wheel assembly is supported above the ground on this side by jack 5 positioned coaxially of the "knee action" spring 7 or at some other point close to the kingpin. The positioning of this jack is very important since, while elevating the wheel to be balanced, it must restrict movement of the axle at the kingpin horizontally, otherwise single-degree-of-freedom for angular movement of the wheel and spindle in a horizontal plane about the kingpin is not obtainable. Planes A and B are the correction planes chosen. Plane A passes through the axis of the kingpin 3 and plane B is defined by the outer edge of the rim of the wheel. Nonsymmetry of mass distribution in the wheel will upon rotation of the wheel develop torques about the kingpin axis to effect an oscillating angular movement of the wheel and spindle about the kingpin. As a result of the positioning of the correction planes, determination of an unbalance correction in plane B will be unaffected by the unbalance component of plane A because the moment of the unbalance force about the kingpin in plane A is zero, there being no moment arm.

Oscillations of the wheel 1 about the kingpin axis 3 may be measured by any suitable type of vibration pickup, one form of which is shown schematically in the drawing and denoted by the numeral 9. It comprises a coil 11, a spring 13, and a movable armature 15 biased by spring 13 to engage the spindle or an extension thereto 17. Inward and outward movements of the armature with respect to the coil 11 in response to spindle vibratory movement will cause a varying voltage in the coil which is indicative of the amplitude of the vibration. Any suitable amplifier 19 (see Fig. 3) and meter 21 in circuit with the pickup coil 11 for measuring the amplitude of the vibratory motion, together with a stroboscopic light source, here represented by an electronic tube, 23, fired at known points on the amplified voltage cycle of the vibration pickup, will serve to measure the amplitude and angular location of the vibration being measured. Inasmuch as the specific pickup circuit or system, that is, the unbalance measuring system, forms no part of my invention, such system has neither been shown nor described in detail.

The vibrating system of Fig. 1 is a heavily damped one, due to friction in the kingpin and steering mechanism. The phase angle between the motion and the force is shown in Fig. 2, assuming sinusoidal motion. The wheel is driven by some external means such as a motor having a pulley and a light flexible belt which is entrained about the perimeter of the tire or wheel and the balancing speed is adjusted to the resonant speed of the vibrating system as indicated by the maximum amplitude reading on a meter such as 21 and maintained constant. At this resonant speed, the phase angle between the unbalance force and motion is known to be 90°. The pickup voltage also fires the stroboscopic light source 23 at a particular known point on the voltage cycle to "freeze" the wheel rotation. Since the phase angle of the vibrating system is known, the position of the wheel under the stroboscopic light, by proper interpretation, indicates the angular position of the unbalance. The amount of unbalance is fairly accurately indicated by the maximum amplitude of vibration. The proper amount of weight $W_1$ is then attached to the outer edge of the wheel rim in the angular position indicated.

When balancing the outside plane of a vehicle wheel as hereinbefore described the pickup 9 is so located that its oscillations occur in the horizontal plane of the kingpin 3, as is shown in Fig. 1. The described balancing method, relative to this horizontal plane, is possible only because angular single-degree-of-freedom exists about the kingpin axis 3. Because of its importance, it is here again stated that horizontal motion of the axle or "knee" at the kingpin cannot be tolerated because a single-degree-of-freedom of the motion in a horizontal plane about the kingpin then no longer exists and the analysis does not apply. Motion at the kingpin more often occurs on the axle type of wheel mounts. However, this motion can be effectively eliminated by moving the supporting jack to a new position as near the kingpin as possible as indicated in dotted outline by reference numeral 5 in Fig. 3. When the pickup device is shifted angularly to a substantially vertical plane (see Fig. 3) for unbalance determinations in plane A, the supporting jack must be relocated approximately beneath the point of spring and axle connection.

Since the unbalance component in plane B is now corrected as hereinbefore described, it obviously follows that vibrations of some new system with a node (or nodes) at a point (or points) somewhat removed from the kingpin, or balancing plane A, are caused by nonsymmetry of mass distribution in plane A. This vibration is utilized to determine the unbalance correction for plane A.

For the unbalance determination in plane A, the vibration system as illustrated in Figs. 3 and 4 is had. The vibration involves bending of the wheel suspension member (or members) with the node at the support. Fig. 3 shows the axle type front wheel suspension of an automobile (or truck) and Fig. 4 shows the "knee action" type of front wheel suspension. The vertical vibration is utilized for the unbalance determination; this motion is very lightly damped, and, due to the steepness of the phase angle curve at resonant speed for such a system—that is, large change in phase angle for small change in speed—accurate phase determinations at resonance are very difficult to achieve. This is indicated graphically in Fig. 5. To eliminate this difficulty, the balancing speed is adjusted to approximately one-half to two-thirds of resonant speed in which speed range the phase angle is known to be of the order of 5° to 15°. In the actual case a slight phase shift with speed of the stroboscopic firing circuit automatically compensates for an average phase shift in the vibration for speeds up to about two-thirds of resonant speed.

To pick up the vertical vibration, it is necessary to shift the vibration pickup 90° into the plane of the vibration. Preferred means for supporting the vehicle wheel assembly during the balancing operation are shown. The vehicle wheel (Fig. 3) being balanced is supported above the ground by means of a jack 6 positioned substantially beneath the point of the spring and axle connection; the opposite wheel may be elevated by means of a block and supports the load of the vehicle on that side. For the "knee action" type of front wheel suspension (Fig. 4), the support jack 5 is positioned substantially coaxially of the "knee action" spring; the wheel on the opposite side may be elevated by means of a block. Supporting means as described establish a single degree of freedom in a vertical plane for the vibration system by providing a pivot or node about which the axle may vibrate in bending. Theoretically the axle should be supported beneath both points of spring and axle connection to form nodal points about which the axle may deflect. However, from a practical viewpoint, undesired vibrations introduced at the far support are negligible and the single support as shown is satisfactory. For further details concerning single-degree-of-freedom systems, suitable for vehicle wheel balancing, reference may be had to my copending application Serial No. 391,046, filed April 30, 1941, entitled Vehicle wheel balancing. The wheel is driven by some external means that will not of itself introduce vibrations and brought to a predetermined constant speed below resonant speed. The position of the unbalance in plane A is then determined in a manner analogous to the unbalance determination for plane B.

Plane A, however, lies outside the wheel and it is necessary to attach the balancing weight $W_2$ to the wheel rim in plane A'. The distance separating these planes, while shown somewhat exaggerated in the drawing, is actually very small and for all practical purposes the correction determined for plane A can be considered applicable to plane A'. The accuracy can be improved, however, by attaching a weight having its mass center in plane A to the wheel rim in plane A', for an extremely accurate "statically" and "dynamically" balanced wheel, the balancing procedure for both planes B and A may be repeated in order.

Rear wheels of vehicles have centers of rotation which remain fixed with respect to the vehicle and there is no simple means for securing a complete "static" and "dynamic" balance. However, "dynamic" unbalance in such cases is not quite as undesirable as in the case of the front or steering wheels due to the heavy and rigid construction of the rear wheel assembly. "Static" balance alone is, therefore, usually satisfactory.

The vibration system utilized for rear wheel "static" balancing is illustrated in Fig. 6, and its schematic equivalent is shown in Fig. 7. In this instance the vehicle wheel to be balanced is supported above the ground on a jack 5 positioned substantially beneath the point of the spring and axle connection; the opposite wheel may be elevated on a block and supports the load of the vehicle on that side. Here again the system has small damping for the vibration amplitude utilized for balancing. The wheel 25 to be balanced is driven by some means that will not introduce undesirable vibrations of its own. The pickup unit is located for measurement of vibrations in a vertical plane and has its armature against the axle or an extension thereto 17 on the wheel opposite to that being balanced. It is preferred to measure the vibrations at this point because the axle is not rotating. Non-symmetry of mass distribution about the axis of rotation in the rotating wheel 25 will develop torques about the point of support 27. The jack 5, in addition to supporting the rear wheel assembly, forms in effect a pivot at its point of engagement therewith 27 about which the rear wheel assembly may angularly oscillate to transmit vibratory motion through the rigid housing and axle assembly 29 to the pickup unit 9. Fig. 7 more clearly illustrates this vibration system. A rigid member 29' representing the housing and axle assembly 29 has attached thereto at each of its ends a mass M and is arranged to pivot about point 27'. Motion of the mass M on the left-hand in the direction indicated by the arrow will be transmitted to the mass M on the right-hand. The upper spring 31' represents forces applied to the axle by the right-hand suspension spring 31 of the vehicle while the lower spring 33' represents forces resiliently exerted by the pneumatic tire 33 of the vehicle in supporting the vehicle on that side.

It is apparent from the foregoing that by utilizing the single-degree-of-freedom systems easily set up in the front wheel steering mechanism of a vehicle and by properly supporting the vehicle wheel and axle assemblies on jacks and analyzing and correcting the wheel unbalance in accordance with the principles of my invention, it is possible to obtain a fundamentally correct balancing procedure that greatly simplifies existing methods and apparatus involved in the balancing of vehicle wheels. Further, errors arising from chassis or body vibrations are eliminated by proper support position, and the complexities arising from the separate "static" and "dynamic" unbalance corrections provided by other methods are eliminated.

I am, of course, aware that others, particularly after having had the benefits of the teachings of my invention, may devise other devices embodying my invention, and I, therefore, do not wish to be limited to the specific showing made in the drawing or the descriptive disclosure hereinbefore made, but wish to be limited only by the scope of the appended claims.

I claim as my invention:

1. The method of balancing a vehicle wheel while mounted on a wheel assembly resiliently suspended from a vehicle comprising the step of placing supporting means beneath said wheel assembly to elevate said wheel above ground and positioning said means at a nodal point as to provide a single-degree-of-freedom vibration system for the assembly so that its vibratory motion is confined to a single plane and has a fixed supported point at which such motion is zero, connecting a vibration pickup device directly with said assembly to measure the amplitude of the vibratory motion of said wheel, rotating the wheel, and securing weight to said wheel after measurement of said vibratory motion at such point as to correct the unbalanced condition therein thereby eliminating said vibratory motion.

2. The method of balancing a vehicle wheel while mounted on a wheel assembly resiliently suspended from a vehicle comprising the steps of rigidly supporting said wheel assembly, to elevate said wheel above ground, in a nodal point so as to provide a single-degree-of-freedom vibration system for the assembly, rotating the wheel at constant speed, measuring the amplitude of the vibration of the supported assembly caused by the rotation in the plane of the vibratory motion, and securing weight to said wheel at such point as to correct the unbalanced condition therein thereby eliminating said vibratory motion.

3. The method of testing the balance of a vehicle wheel while mounted on a wheel assembly resiliently suspended from a vehicle comprising the steps of elevating the wheel above the surface of the ground by rigidly supporting the assembly at a nodal point so as to provide a single-degree-of-freedom vibration system that is, one in which the vibratory motion is confined to a single plane while the motion at the supported point is zero, rotating said elevated wheel at a predetermined constant speed, and measuring the amplitude of the vibratory motion of said wheel in the plane of said motion by engaging a vibration pickup directly with the wheel assembly.

4. The method of balancing a vehicle wheel rotatable about a spindle angularly movable about the substantially vertical kingpin axis of a resiliently suspended wheel assembly, which comprises the steps of placing supporting means beneath said wheel assembly for elevating said wheel above ground and positioning said means successively at different nodal points so as to provide single-degree-of-freedom vibration systems in said wheel assembly, one in a horizontal plane for providing angular freedom of said wheel and spindle about said kingpin axis and one in a vertical plane for providing vibration in bending of said wheel assembly about said point of support that will respond only to unbalance in said wheel upon rotation thereof, rotating the wheel after each positioning at a predetermined speed, sequentially measuring the amplitude of the vibratory motion first in said horizontal plane and second in said vertical plane, securing a weight to the wheel at such point after measurement of vibration in said horizontal plane as to eliminate vibration in said horizontal plane, and securing a second weight to the wheel at such point after measurement of vibration in said vertical plane as to eliminate vibration in said vertical plane, in order to obtain by the combined effect of said two weights a completely balanced wheel.

5. The method of balancing a vehicle wheel rotatable about a spindle angularly movable about the substantially vertical kingpin axis of a resiliently suspended wheel assembly, which comprises the steps of placing supporting means beneath said wheel assembly for elevating said wheel above ground and positioning said means successively at different nodal points so as to provide a single-degree-of-freedom vibration system, rotating the elevated wheel at constant speed, engaging a vibration pickup with the spindle for determining vibrations of the spindle caused by the wheel rotation, and attaching balancing weight to the wheel to eliminate such vibration.

6. The method of balancing a vehicle wheel rotatable about a spindle angularly movable about the substantially vertical kingpin axis of a resiliently suspended wheel assembly, which comprises the steps of placing supporting means beneath said wheel assembly for elevating said wheel above ground and positioning said means successively at different nodal points so as to provide single-degree-of-freedom vibration systems in said wheel assembly, one in a horizontal plane for providing angular freedom of said wheel and spindle about said kingpin axis and one in a vertical plane for providing vibration in bending of said wheel assembly about said point of support that will respond only to unbalance in said wheel upon rotation thereof, rotating the wheel after each positioning at a predetermined speed, sequentially measuring the amplitude of the vibratory motion first in said horizontal plane and second in said vertical plane, securing a weight to the outer edge of the rim of the wheel at such point after measurement of vibration in said horizontal plane as to eliminate vibration in said horizontal plane, and securing a second weight to the inner edge of the rim of the wheel at such point after measurement of vibration in said vertical plane as to eliminate vibration in said vertical plane, in order to obtain by the combined effect of said two weights a completely balanced wheel.

7. A method as set forth in claim 4, wherein the supporting means are placed adjacent said kingpin axis while performing said measurement of the amplitude and elimination of the angular vibratory motion of said wheel and spindle in said horizontal vibration plane, and wherein the supporting means are subsequently positioned beneath the point of connection of the wheel assembly to the resilient suspension adjacent the wheel while performing said measurement in said vertical plane.

8. The method of balancing a vehicle wheel rotatable about a spindle angularly movable about the substantially vertical kingpin axis of a resiliently suspended wheel assembly, which comprises the steps of supporting said wheel above ground at a point beneath said wheel assembly to provide a single-degree-of-freedom vibration system in said wheel assembly in a horizontal plane providing angular freedom of said wheel and spindle about said kingpin axis, rotating said wheel at a constant resonant speed, measuring the amplitude of the vibratory motion in said horizontal plane, adding weight to said wheel to eliminate unbalance conditions therein causing said wheel and spindle to angularly vibrate about said kingpin axis in said horizontal plane, and thereafter supporting said wheel above ground at a different point beneath said assembly to provide a single-degree-of-freedom vibration system in a vertical plane for bending vibrations of said assembly about the latter point of support, rotating said wheel at a constant speed less than resonant speed, measuring the amplitude of the vibratory motion in said vertical plane, and adding weight to said wheel to eliminate unbalance conditions therein causing said wheel and spindle to vibrate in said vertical plane.

9. The method of detecting the unbalance of a vehicle wheel rotatable about a spindle angularly movable about the substantially vertical kingpin axis of a resiliently supported wheel assembly, comprising the steps of supporting the wheel at a nodal point beneath said wheel assembly to provide a single-degree-of-freedom vibration system in a horizontal plane so as to eliminate the effect of external vibration, rotating the wheel at constant resonant speed, and measuring the amplitude of the angular vibratory motion of said spindle about said kingpin axis in said horizontal plane.

10. The method of detecting the unbalance of a vehicle wheel forming part of a wheel assembly resiliently suspended from a vehicle and having coaxial wheels with fixed axles with respect to each other, which comprises the steps of supporting the wheel above ground beneath the point of connection of said wheel assembly with the resilient suspension adjacent said wheel to provide a nodal point about which said wheel assembly may angularly vibrate in a vertical plane in response to an unbalance in said wheel upon rotation thereof, rotating the wheel at constant speed, and measuring the amplitude of the angular vibratory motion of the axle of the opposite wheel.

11. The method of determining the unbalance of a wheel while mounted on a vehicle having a wheel assembly carrying the wheel and a spring connecting the assembly to the vehicle, which comprises the steps of imparting rotation to the wheel while suspending the wheel in space by rigidly supporting the assembly at a nodal point of the oscillation so as to prevent the transmission of vibration from the wheel assembly through the spring to the vehicle, connecting pick-up means with the wheel assembly and measuring the unbalance oscillations of the assembly in dependence upon the speed of rotation.

12. The method of determining the unbalance of a wheel while mounted on a vehicle having a wheel assembly carrying the wheel and a spring connecting the assembly to the vehicle, which comprises the steps of imparting rotation to the wheel while suspending the wheel in space by rigidly supporting the assembly at the nodal point beneath the connection of the spring with the vehicle so as to prevent the transmission of vibration, due to unbalance oscillation of the wheel, to the vehicle, connecting pick-up means with the wheel assembly and measuring the unbalance oscillations of the assembly in dependence upon the speed of rotation.

13. The method of determining the unbalance of a wheel while mounted on a vehicle having a wheel assembly carrying the wheel and a spring connecting the assembly to the vehicle, which comprises the steps of suspending the wheel in space by rigidly supporting the assembly at the point of connection of the spring to the wheel assembly so as to make the spring inoperative to transmit vibration, due to unbalance of the wheel, to the vehicle, and rotating the wheel at different speeds while determining the amplitude of its unbalance oscillations by coupling a vibration pick-up directly with the assembly.

ARTHUR C. HAGG.